(12) United States Patent
Lan et al.

(10) Patent No.: US 8,942,490 B2
(45) Date of Patent: Jan. 27, 2015

(54) METHOD OF HIGH PERFORMANCE IMAGE COMPRESSION

(76) Inventors: Yin-Chun Blue Lan, Wurih Township, Taichung County (TW); Yen Chuo, Taipei (TW); Po-Chih Chang, Taichung (TW)

(*) Notice: Subject to any disclaimer, the term of this patent is extended or adjusted under 35 U.S.C. 154(b) by 732 days.

(21) Appl. No.: 12/217,602

(22) Filed: Jul. 8, 2008

(65) Prior Publication Data
US 2010/0008571 A1    Jan. 14, 2010

(51) Int. Cl.
G06K 9/36 (2006.01)
H04N 19/426 (2014.01)
H04N 19/152 (2014.01)
H04N 19/182 (2014.01)

(52) U.S. Cl.
CPC ....... *H04N 7/26712* (2013.01); *H04N 7/26186* (2013.01); *H04N 7/26255* (2013.01)
USPC .......................................... 382/232; 375/240

(58) Field of Classification Search
CPC .................................. H04N 7/30; H04N 7/50
See application file for complete search history.

(56) References Cited

U.S. PATENT DOCUMENTS

| | | | | |
|---|---|---|---|---|
| 4,376,933 A * | 3/1983 | Saran et al. | 341/67 |
| 4,914,675 A * | 4/1990 | Fedele | 375/253 |
| 5,268,769 A * | 12/1993 | Tsuchiya et al. | 382/246 |
| 5,499,382 A * | 3/1996 | Nusinov et al. | 712/210 |
| 5,604,498 A * | 2/1997 | Park | 341/65 |
| 5,949,795 A * | 9/1999 | Moroney et al. | 370/516 |
| 5,973,627 A * | 10/1999 | Bakhmutsky | 341/67 |
| 6,064,489 A * | 5/2000 | Nosaki et al. | 358/1.13 |
| 6,101,221 A * | 8/2000 | Varanasi et al. | 375/240 |
| 6,141,742 A * | 10/2000 | Favor | 711/220 |
| 6,269,183 B1 * | 7/2001 | Matoba et al. | 382/166 |
| 6,272,566 B1 * | 8/2001 | Craft | 710/53 |
| 6,414,609 B1 * | 7/2002 | Zukawa et al. | 341/67 |
| 6,496,602 B2 * | 12/2002 | Masuo | 382/246 |
| 6,654,872 B1 * | 11/2003 | Ramesh et al. | 712/204 |
| 6,934,338 B1 * | 8/2005 | Bublil et al. | 375/240.23 |
| 6,993,080 B2 * | 1/2006 | Saunders et al. | 375/240.25 |
| 7,218,677 B2 * | 5/2007 | Otsuka | 375/253 |
| 7,397,855 B2 * | 7/2008 | Chen | 375/240.04 |
| 7,599,439 B2 * | 10/2009 | Lavelle et al. | 375/240.26 |
| 2003/0014715 A1 * | 1/2003 | Lobinger et al. | 714/791 |
| 2004/0021591 A1 * | 2/2004 | Maruya et al. | 341/60 |
| 2005/0102574 A1 * | 5/2005 | Larson et al. | 714/30 |
| 2005/0135433 A1 * | 6/2005 | Chang et al. | 370/536 |
| 2006/0010151 A1 * | 1/2006 | Star Sung | 707/102 |
| 2006/0036759 A1 * | 2/2006 | Shen et al. | 709/234 |
| 2007/0041391 A1 * | 2/2007 | Lin et al. | 370/412 |
| 2007/0116115 A1 * | 5/2007 | Tong et al. | 375/240.03 |
| 2007/0226420 A1 * | 9/2007 | Sung | 711/123 |
| 2008/0025340 A1 * | 1/2008 | Alvarez Arevalo et al. | 370/448 |
| 2008/0056381 A1 * | 3/2008 | Sung et al. | 375/240.26 |
| 2008/0304564 A1 * | 12/2008 | Kim et al. | 375/240.03 |
| 2009/0003717 A1 * | 1/2009 | Sekiguchi et al. | 382/238 |
| 2009/0097764 A1 * | 4/2009 | Sung | 382/239 |
| 2009/0100309 A1 * | 4/2009 | Zheng | 714/748 |
| 2009/0238198 A1 * | 9/2009 | Niu et al. | 370/412 |

(Continued)

Primary Examiner — Vikkram Bali
Assistant Examiner — Xuemei Chen

(57) ABSTRACT

A method of compressing an image is provided by saving compressed color components into temporary buffers. In different time slots, compressed color components are stored in different temporary buffer. When data in the temporary buffers reach a predetermined size, data are moved to a second buffer larger than the temporary buffers. When the second buffer stores a predetermined amount of data, data are moved to an external memory.

11 Claims, 6 Drawing Sheets

(56) References Cited

U.S. PATENT DOCUMENTS

2009/0290045 A1* 11/2009 Fukuda et al. ............ 348/231.99
2009/0310857 A1* 12/2009 Sung et al. .................... 382/166
2010/0265525 A1* 10/2010 Hagiwara ...................... 358/1.9
2010/0321568 A1* 12/2010 Le Pifre ......................... 348/462
2011/0080956 A1* 4/2011 Zhou et al. ............... 375/240.24

* cited by examiner

METHOD OF HIGH PERFORMANCE IMAGE COMPRESSION

BACKGROUND OF THE INVENTION

1. Field of Invention

The present invention relates to method of image compression, and particularly relates to image compression method by applying an intelligent output buffer input and output control determining the starting location of storing the compressed pixels in a larger buffer.

2. Description of Related Art

Compression has key benefits in cost reduction of storage device and speedup in accessing the compressed data. Most popular still image compression standards including JPEG, JPEG2000 are lossy algorithms which cause data difference by quite high degree of difference between the compressed-decompressed image and the original image during the procedure of image compression. The data loss caused by lossy compression algorithm degrades the image quality which might not be acceptable in some applications.

There are very few lossless image compression algorithms of image data reduction. One of the most commonly adopted approach is taking differential value between adjacent pixels and applying the so called "entropy coding" or "Variable Length Coding" method which uses the shortest code to represent the most frequent happened pattern which does not guaranty the data ratio due to the uncertainty of the complexity of the image to be compressed.

Lossy compression algorithms can achieve higher compression rate, for example, the JPEG has between 10 to 20 times compression ratio, at the cost of sacrificing the image quality and large amount of computing power and temporary storage buffer. Sharp image quality can be achieved by the lossless compression algorithm but the compression rate is most likely lower than that of the popular lossy algorithms like JPEG or JPEG2000.

The method of this invention of image data compression is to achieve a reasonable high compression ratio with simple means of realizing in both hardware and software without sacrificing much the image quality compared to prior art lossless compression algorithms and has an input-output buffer control which more accurately determines the starting location of each group of compressed pixels with high speed of compression and decompression.

SUMMARY OF THE INVENTION

In prior art image compression methods, due to high density of the output buffer, it costs long delay to obtain the beginning of each group of the compressed pixels and larger hardware to decode the compressed pixels. The present invention is related to a method of the image compression with intelligent output control by rotating before storing the compressed multiple color components into the temporary image buffer with predetermined density ratio between the $1^{st}$ temporary buffer and larger output buffer and an intelligent method of deciding the starting location of storing each group of the compressed pixels. The present invention significantly speeds up the mechanism of compressing and decompressing the group of pixels and reduces the required density of the storage device compared to other counter part high quality compression methods.

The present invention of the image compression compresses multiple color components separately and packing them into a temporary buffer in a predetermined frequency with rating the order of color components which can minimize the need of larger density of the temporary buffer.

The present invention of the image compression sends the buffered compressed image to another storage device only when all color components reach a predetermined threshold amount of bits.

The present invention of the image compression compresses multiple color components separately and packing them into the $1^{st}$ temporary buffer till each of all compressed color components reach the predetermined amount and load the compressed group of pixels into another temporary buffer which has higher density.

According to another embodiment of the present invention, the starting locations of the $2^{nd}$ which stores each compressed group of pixels are predetermined which is the same length of the depth of the $1^{st}$ temporary buffer.

According to an embodiment of this invention, when the level of the output buffer is in between two predetermined levels, a corresponding compression ratio will be enforced to compress the image.

According to another embodiment of the present invention, the differential ratio between the input data and the output data amount within the $2^{nd}$ buffer determines the starting location of storing each group of compressed pixels.

It is to be understood that both the foregoing general description and the following detailed description are by examples, and are intended to provide further explanation of the invention as claimed.

DESCRIPTION OF THE PREFERRED EMBODIMENTS

Due to sharp quality and good immunity to the noise, and convenience in storage, the digital image has prevailingly become popular in mass applications like digital camera, digital camcorder, digital photo albums, scanner/printer/fax, image archiving and storage . . . etc.

ITU and ISO have developed and defined some image and video compression algorithms including JPEG, a still image compression standard and MPEG, the video compression standard. The JPEG image has widely applications with the cost of data loss compared to the original image.

Figure 1A:
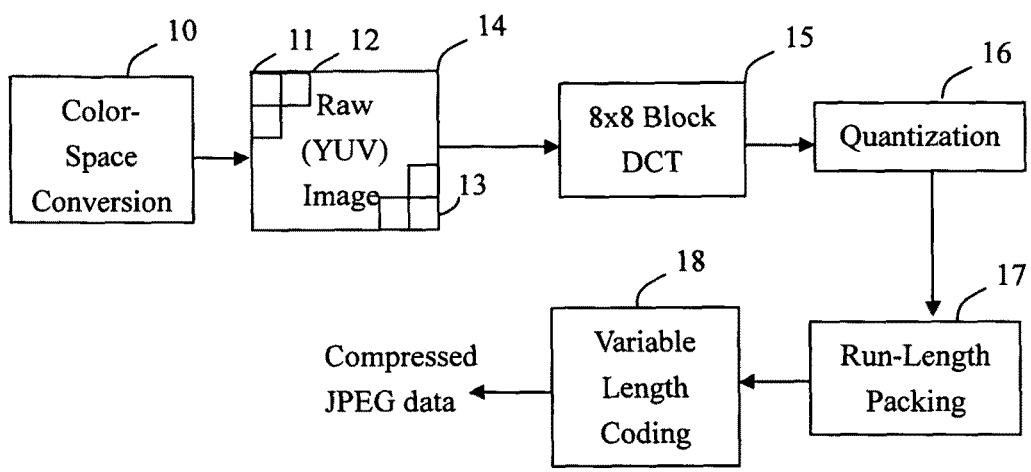
FIG. 1A depicts a prior art, the JPEG still image compression procedure which is a lossy algorithm.

JPEG image compression as shown in FIG. 1A, a prior art of still image compression algorithm, includes some procedures in compression. The color space conversion 10 is to separate the luminance (brightness) from chrominance (color) and to take advantage of human being's vision less sensitive to chrominance than to luminance and the can reduce more chrominance element without being noticed. An image 14 is partitioned into many units of so named "Block" of 8×8 pixels to run the JPEG compression.

A color space conversion 10 mechanism transfers each 8×8 block pixels of the R (Red), G (Green), B (Blue) components into Y (Luminance), U (Chrominance), V (Chrominance) and further shifts them to Y, Cb and Cr. JPEG compresses 8×8 block of Y, Cb, Cr 11, 12, 13 by the following procedures:

Step 1: Discrete Cosine Transform (DCT)
Step 2: Quantization
Step 3: Zig-Zag scanning
Step 4: Run-Length pair packing and
Step 5: Variable length coding (VLC).

DCT 15 converts the time domain pixel values into frequency domain. After transform, the DCT "Coefficients" with a total of 64 sub-bands of frequency represent the block image data, no long represent single pixel. The 8×8 DCT coefficients form the 2-dimention array with lower frequency accumulated in the left top corner, the farer away from the left top, the higher frequency will be. Further on, the closer to the left top, the more DC frequency which dominates the more information. The more right bottom coefficient represents the higher frequency which less important in dominance of the information. Like filtering, quantization 16 of the DCT coefficient is to divide the 8×8 DCT coefficients and to round to predetermined values. Most commonly used quantization table will have larger steps for right bottom DCT coefficients and smaller steps for coefficients in more left top corner. Quantization is the only step in JPEG compression causing data loss. The larger the quantization step, the higher the compression and the more distortion the image will be.

After quantization, most DCT coefficient in the right bottom direction will be rounded to "0s" and only a few in the left top corner are still left non-zero which allows another step of said "Zig-Zag" scanning and Run-Length packing 17 which starts left top DC coefficient and following the zig-zag direction of scanning higher frequency coefficients. The Run-Length pair means the number of "Runs of continuous 0s", and value of the following non-zero coefficient.

The Run-Length pair is sent to the so called "Variable Length Coding" 18 (VLC) which is an entropy coding method. The entropy coding is a statistical coding which uses shorter bits to represent more frequent happen patter and longer code to represent the less frequent happened pattern. The JPEG standard accepts "Huffman" coding algorithm as the entropy coding. VLC is a step of lossless compression procedure.

Figure 1B:
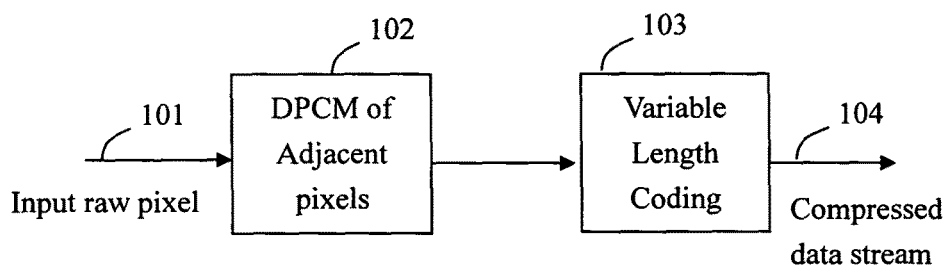
FIG. 1B depicts another prior art of image compression: DPCM and a VLC coding.

A well known prior art of the lossless image compression method is shown in FIG. 1B which calculates the differential value 102 of the input adjacent pixels 101 and runs the variable length coding 103, the VLC coding. A VLC coding uses the shortest code to represent the most frequent happen pattern, and longer code to represent the less frequent happen pattern. Though having simplicity in realization, the disadvantage of the prior art in FIG. 1B is that it can not reach higher compression rate.

JPEG is a lossy compression algorithm, the JPEG picture with less than 5× compression rate has sharp image quality, 10× compression will have more or less noticeable quality degradation.

The JPEG compression procedures are reversible, which means the following the backward procedures, one can decompresses and recovers the JPEG image back to raw and uncompressed YUV (or further on RGB) pixels. The main disadvantage of JPEG compression algorithm is the input data are sub-sampled and the compression algorithm itself is a lossy algorithm caused by quantization step which might not be acceptable in some applications.

Very few lossless image compression algorithms have been developed due to the following two factors:

The standard JPEG Image with 10× compression rate has still acceptable good image quality in most applications.
It is tough to achieve high compression rate of the lossless compression.

This invention of the image compression overcomes the disadvantages of both lossy compression algorithm like JPEG and another prior art of VLC coding of the differential values of adjacent pixel in quality and compression rate issues.

Figure 2:
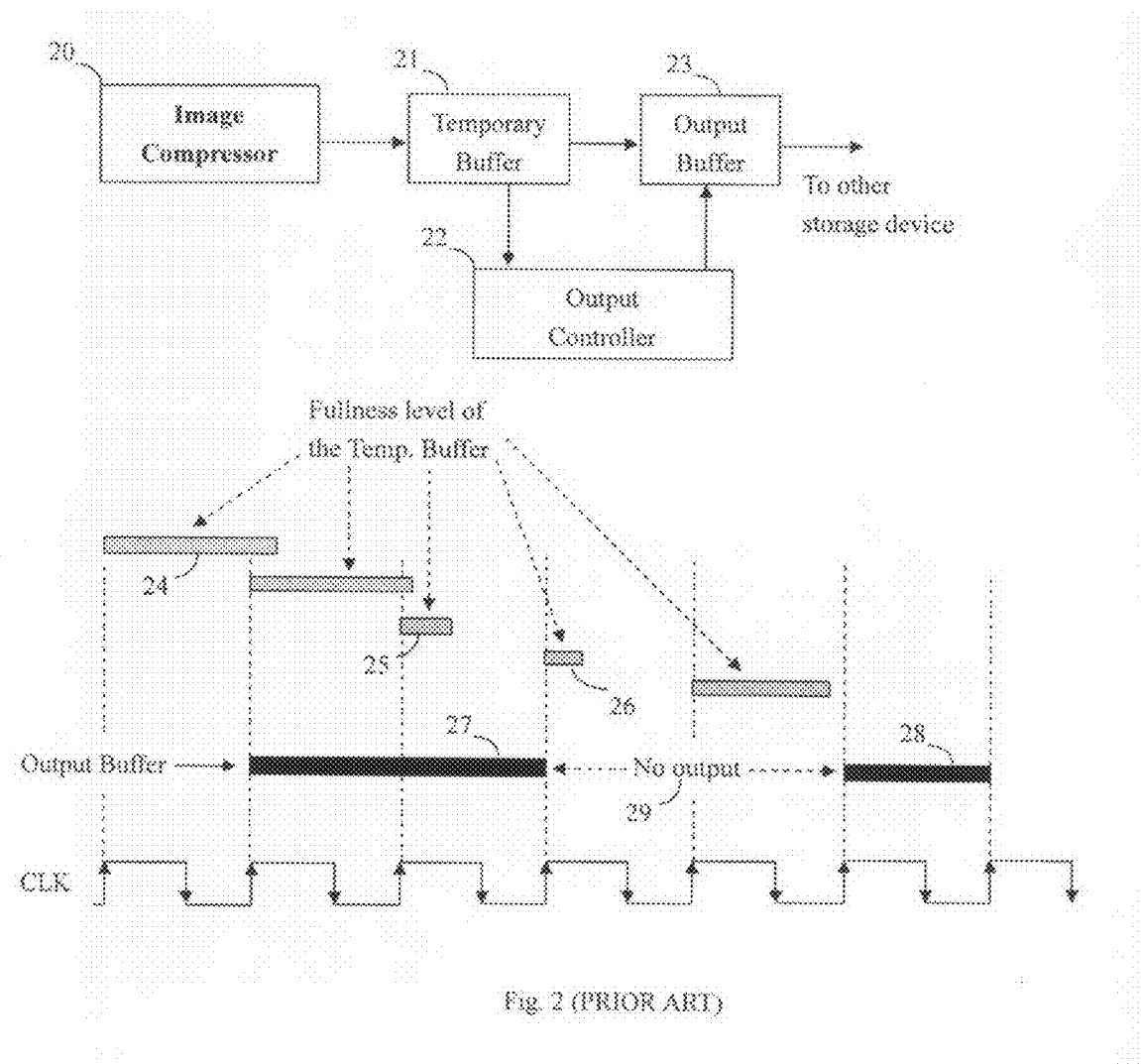
FIG. 2 depicts a prior art image compression with output control and the related data output waveforms.

Most prior art compression methods 20, as shown in FIG. 2 calculate the difference of adjacent pixels for most pixels and applying a VLC coding method. The prior art method is applying an buffer control 22 to decide when and how to send the compressed pixels which is temporarily stored in a buffer 21 into another output buffer 23. One of the drawbacks of this kind of prior art image compression is inconsistency of compression ratio of each group of pixels which results in variable data rate of the compressed group of pixels. Some groups of pixels having complex patterns result in more bit rate to represent them causing more full level 24 of the temporary buffer. While some groups of pixels having simple patterns result in less bit rate and causing lower level 25, 26 of the temporary buffer. Most image display system have one pixel comprising three color components, Red, Green and Blue, or Y, U, V. Sometimes, one of the three components is very complex which make difficulty in storing with limited buffer density. In some region of an image, one or two color component has simple pattern and after compression, the compressed data amount is too few and can make the output buffer empty and no data to be sent out. In some clock cycles 27, 28 will there compressed pixels to be output and some cycle time 29 might not enough compressed pixels data to be sent out due to the emptiness of the output buffer resulted from continuous simple groups of pixels. This kind of prior art image compression requires complex memory interface control and system design.

Figure 3:
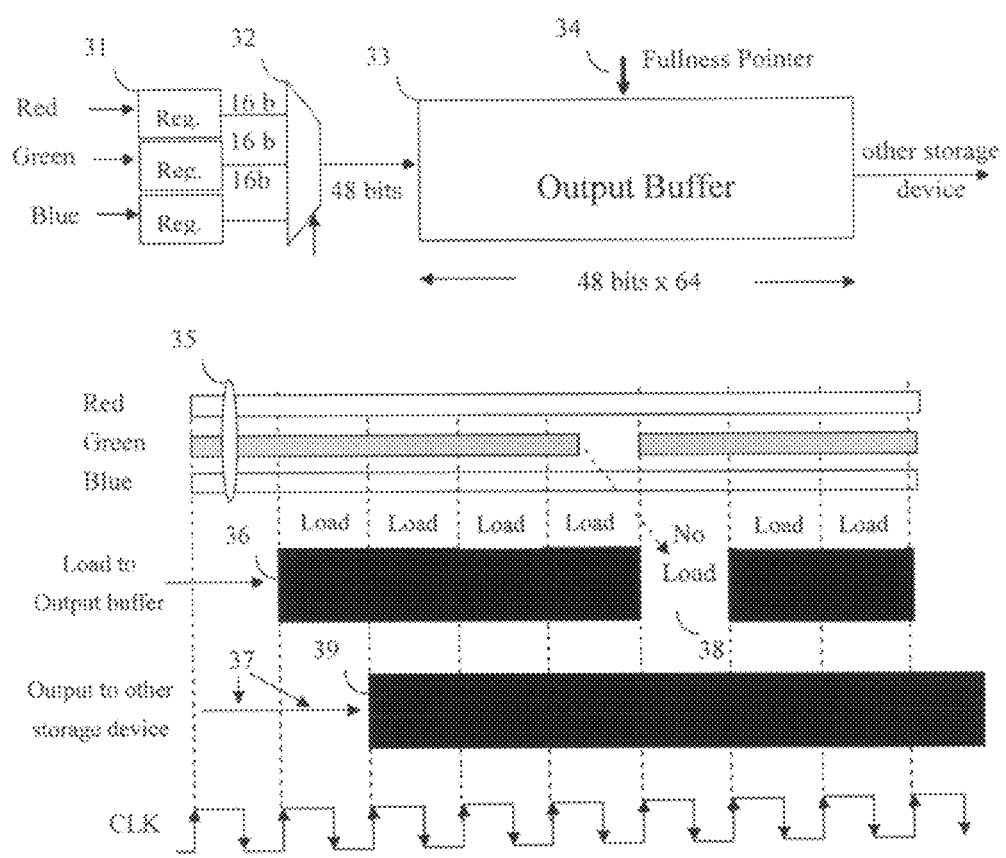
FIG. 3 depicts the conceptual diagram of this invention of image compression with output buffer with a mechanism avoiding the underflow or overflow.

FIG. 3 depicts this invention of image compression with an intelligent output buffer control mechanism which overcomes the drawback of prior art of image compression as described in above paragraph. The registers 31 temporarily saving the compressed 3 color components with rotated order of storing the Red, Green, Blue 3 color components, or Y, U and V components. Which means, in each fixed time frame, the 3 registers will store R,G,B in T1 time slot, and G,B,R in T2 time slot, B,R,G in T3 time slot, and R,G,B again in T4 time slot. The output of the 3 registers will be shifted 32 to another bigger output buffer 33 only when all 3 registers reach the same predetermined depth of data, for example, 16 bits. To ensure the constant data output rate, the output buffer will not send the compressed pixels out till it reaches the predetermined level of fullness with a pointer 34 tracking the fullness of the output buffer.

In each predetermined time slot, the 3 registers' controller will check the level of the 3 registers, if all of the 3 registers reach the predetermined level 35, the compressed color components will be loaded 36 to the output buffer. If one of the 3 color component has too simple pattern resulting in not enough compressed data and in that corresponding time slot, the compressed pixel in the 3 registers will NOT be loaded 38 to the output buffer. This invention of rotating the compressed color components successfully reduces the probability of having one of them getting insufficient compressed data to let compressed data within the 3 registers to be loaded to the output buffer. And the output buffer has a pointer 34 to monitor the fullness level of the output buffer and decides the time to send the compressed pixel out 37. The first compressed data will not be sent out to other device 39 like an external memory until the output buffer reaches the predetermined level. This kind of mechanism controlling the output data successfully avoid overflow and underflow of the output buffer with minimized density of the output buffer.

Figure 4:
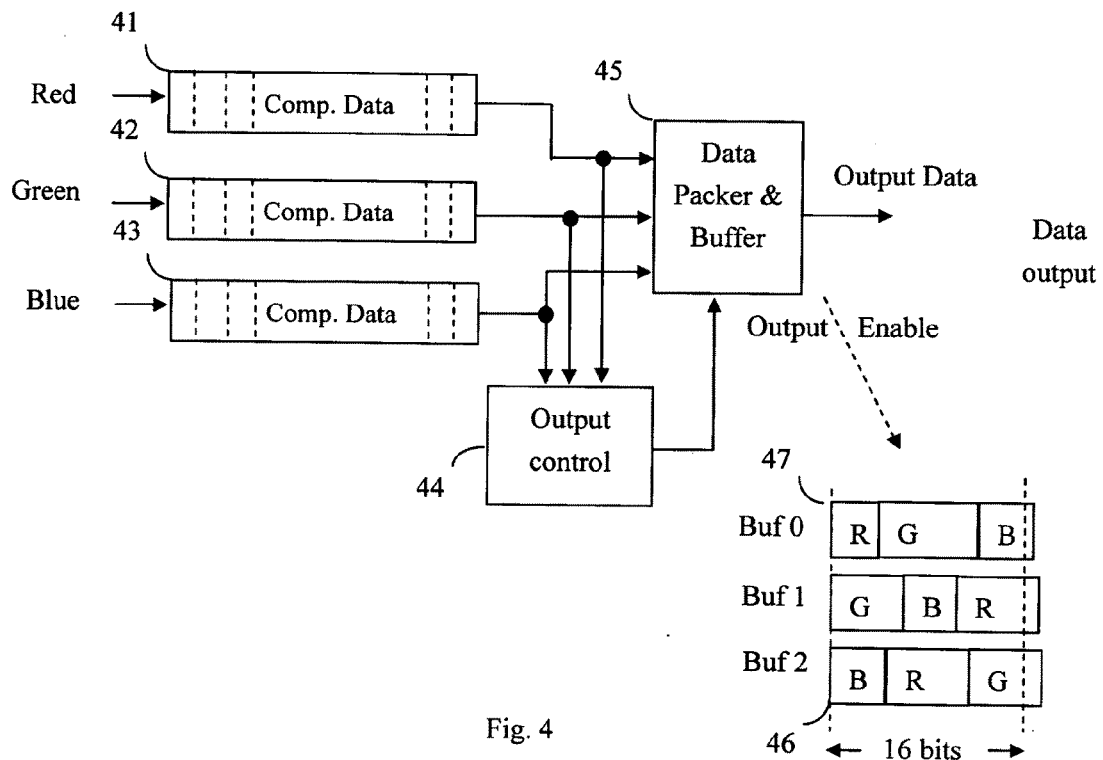
FIG. 4 depicts this invention of the image compression with well controlled rotating the compressed color components into the output buffer to minimize the required buffer size to avoid underflow and overflow.

A more detail explanation of this invention is shown in FIG. 4 which include a temporary buffer saving the compressed 3 color components 41, 42, 43 (R,G,B or Y,U,V) and will be loaded to the output buffer 45 with each rotated order in different time slot. The compressed pixel data within the output buffer will not be sent out till a predetermined level 47, for example, 16 bits is reached. An intelligent buffer controller 44 is used to calculate the fullness of the output buffer and decides when the compressed pixel data can be shifted out to other device.

Figure 5:
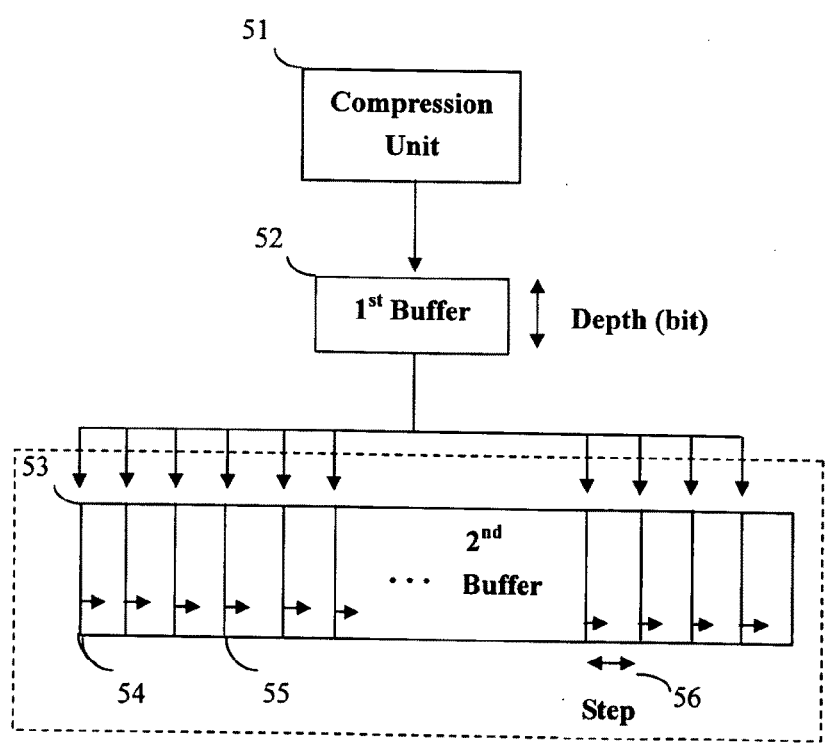
FIG. 5 illustrates this invention of loading data from the $1^{st}$ temporary buffer to another output buffer.

FIG. 5 illustrates the conceptual diagram of the output buffer input and output control. In each time slot, the compression unit 51 receives and compressed a group of pixels and saved into the first temporary buffer 52. The compressed color components are rotated and saved into the first temporary buffer and waits till the right time to be loaded into the second buffer 53. The first buffer is smaller than the second buffer in density. When the level of the compressed pixels reaches the predetermined level, the compressed data will be loaded to the second buffer with predetermined starting location of each group. The starting locations 54, 55 are decided by the depth of the first buffer. Which means the step 56 of location within the second buffer is the depth of the first buffer. With this mechanism of loading compressed data from the first buffer to the second buffer, one can easily access any location of the second buffer with short access and decoding time delay.

Figure 6:
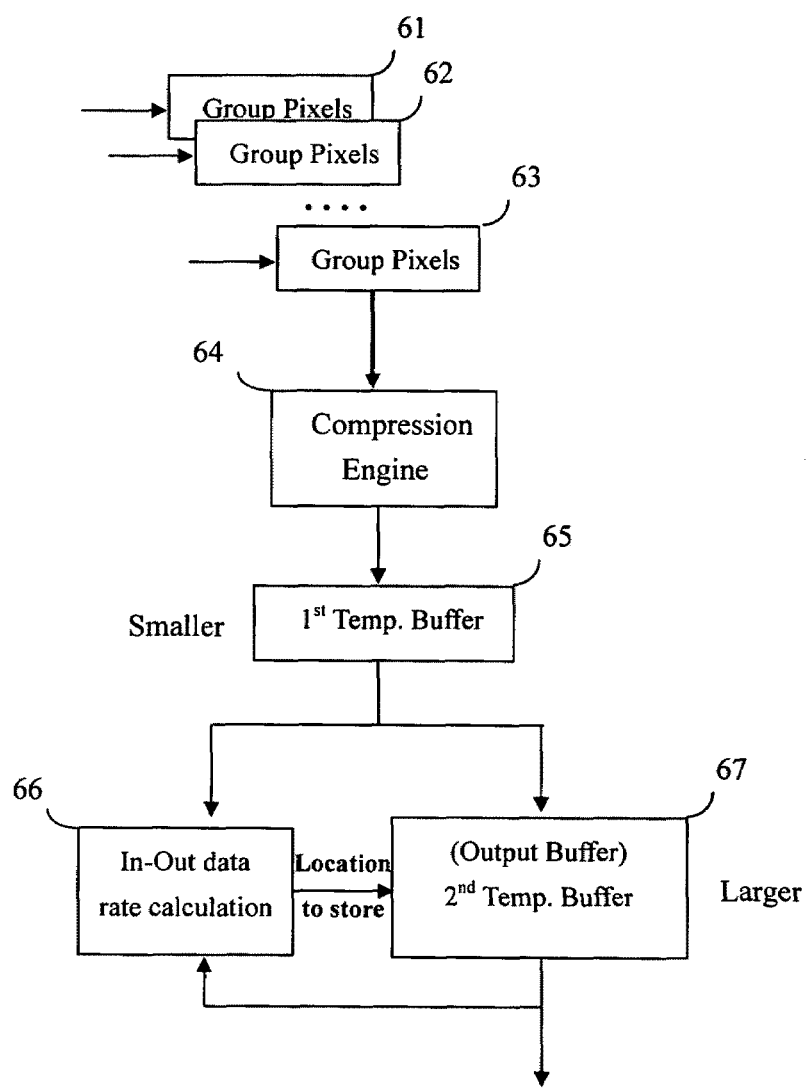
FIG. 6 depicts the mechanism of this invention of image compression with in-out data rate calculation as the location control of the output buffer data storing.

To avoid the output buffer, or said the second buffer getting out of data or said underflow or overflow, this invention has an intelligent output buffer control mechanism as shown in FIG. 6 which results in high speed and high throughput image compression method. Each group of pixels 61, 62, 63 are sent to the compression engine 64. As described in above paragraph, the compression engine loads the compressed data into a small temporary buffer or said the first buffer 65. When the data amount reaches a predetermined level, the data within the first buffer is loaded to the second buffer 67. The output buffer also sends the data out to other device, for example, a DRAM memory chip or another temporary buffer before sending to the memory device. The ratio of input data to the output buffer and the output data from output buffer is calculated 66 and compared to some predetermined thresholds to decide the starting location of saving each group of compressed pixels into the output buffer. By doing this, if a predetermined data ratio within a group (or said for example a line or a frame of image) of pixels is reached or higher compression ratio is achieved, the reserved storage within the space of the output buffer can be empty. And when decoding the compressed data, it is hard to decide the location of the starting pixel of each group of pixels which is a common drawback of prior art designs of the output buffer in image compression. The main advantage of the present invention comes from the following breakthrough approaches.

Speed Up Mechanism:
1. Bit-step process happens in small packing buffer, said the $1^{st}$ temporary buffer, and fewer combinational logics are required.
2. The larger output buffer, or said the $2^{nd}$ buffer, deals with slot-step process only, fewer slot positions means few combinational logics are required
3. Packing (or said, the $1^{st}$ temporary buffer) buffer and larger output buffer, or said the $2^{nd}$ buffer proceed in parallel, the timing bottleneck falls on small packing buffer only.

Figure 7:
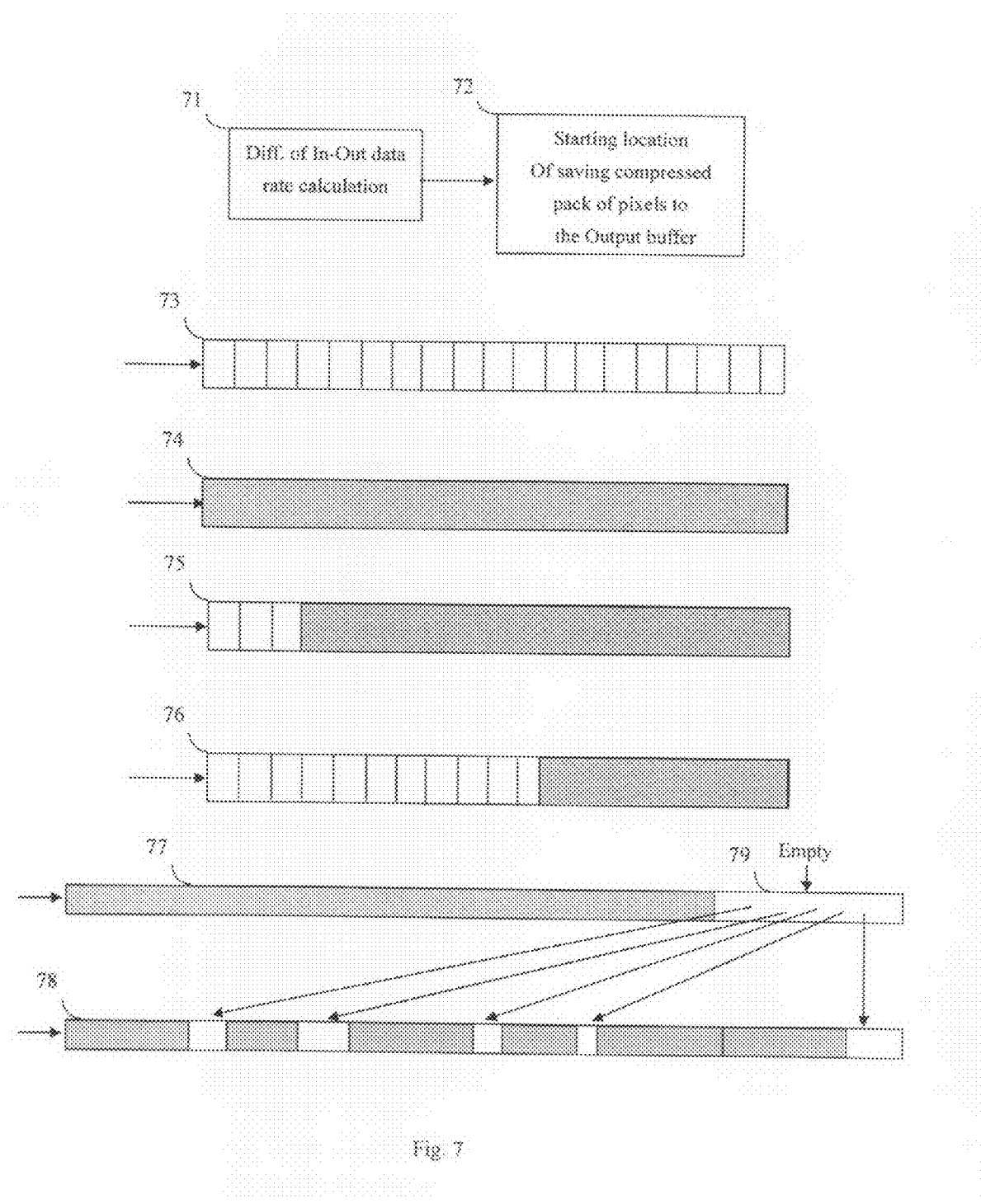
FIG. 7 illustrates details of this invention of how the in-out data rate calculation and the starting location control of each compressed group of pixels.

FIG. 7 specifies the concept of controlling the starting location 72 of the second buffer by calculating the difference of the input and output data rates of the output buffer. The difference is compared to threshold values to decide the starting location of each reserved storage space 73 of the output buffer. For example, if the data rate of input and output of the output buffer is greater or the same or within TH1, the starting location can be the beginning 74 of the reserved space of the output buffer. If the data rate of input is less than the output of the output buffer and is between TH1 and TH2, then, the starting location can be the beginning three bytes after the starting location 75 of the reserved space of the output buffer. And if the data rate of input is less than the output of the output buffer and is between TH2 and TH3, then, the starting location can be the beginning eleven bytes after the starting location 76 of the reserved space of the output buffer. The mechanism of loading the compressed pixel data of this invention avoids the potential accumulative non-used or said an empty space 79 within a reserved storage space 77. Instead, the intelligent of loading and sending out the compressed data within the output buffer of the present invention results in a more "Distributed empty space" 78 which helps quickly accessing and decompressing any group of compressed pixels by reducing the chain delay of the combinational logic in decoding the location of each group of the compressed pixels.

It will be apparent to those skills in the art that various modifications and variations can be made to the structure of the present invention without departing from the scope or the spirit of the invention. In the view of the foregoing, it is intended that the present invention cover modifications and variations of this invention provided they fall within the scope of the following claims and their equivalents.

What is claimed is:

1. An image compression method, comprising:
   compressing a group of pixels by separately compressing n color components of each single pixel, wherein n is an integer;
   storing the compressed color components of the group respectively into n registers in a first buffer within a predetermined time slot;
   compressing another group of pixels by separately compressing n color components of each single pixel;
   storing the compressed color components of the another group respectively into the n registers in the first buffer within another predetermined time slot, wherein the compressed color components of the another group rotated by shifting one color components before the storing;
   packing the compressed data in the n registers in partial or an entire length into predetermined fixed-depth segments;

shifting the compressed data segments into a second buffer when the depth of each of the n registers reaches the fixed depth; and determining the storing location of the compressed data in the second buffer by calculating the difference between input data rate and output data rate of the second buffer.

2. The method of claim 1, wherein the first buffer has smaller capacity than the second buffer.

3. The method of claim 1, wherein the second buffer calculates the fullness of the second buffer and shifts compressed data into another device when the fullness of the second buffer reaches a predetermined level.

4. The method of claim 1, wherein the staring location of each shifted compressed data segment is determined by the fixed depth.

5. The method of claim 1, wherein n equals 3 and when all the depths of the 3 registers reach the fixed depth, the compressed data in the 3 register is shifted into the second buffer together.

6. A method of compressing an image, comprising:
compressing a predetermined amount of pixels by compressing each group of pixels in a separate time slot with a constant frequency;

storing the compressed groups of pixels into a first buffer with smaller capacity, and in predetermined time slots, moving the compressed data from the first buffer into a second buffer which has larger capacity;

calculating a difference of the input data rate and the output data rate within the second buffer; and comparing the difference with predetermined threshold levels to decide the starting location of each group of the compressed pixels, wherein deciding the starting location of each group of the compressed pixels includes inserting distributed dummy codes into each group of the compressed pixels.

7. The method of claim 6, wherein when second buffer data amount is below a predetermined amount, lower compression ratio is enforced, and when the second buffer data amount is above another predetermined amount, higher compression ratio is enforced.

8. The method of claim 6, wherein a non-stop mechanism is enforced when shifting compressed data from the first buffer into the second buffer.

9. The method of claim 6, wherein at least two threshold levels are preset to decide at least two starting locations of the compressed groups of pixels in the second buffer.

10. The method of claim 6, wherein when the difference is larger or equal to a threshold level, the starting location of a compressed group of pixels is set at the beginning location of a predetermined starting location and no distributed dummy codes are inserted.

11. The method of claim 6, wherein when the difference is smaller than a threshold level, distributed dummy codes are inserted at the beginning location of a predetermined starting location of a compressed group of pixels.

* * * * *